United States Patent
Chery et al.

(10) Patent No.: US 9,441,964 B2
(45) Date of Patent: Sep. 13, 2016

(54) INCLINOMETER

(71) Applicants: CENTRE NATIONAL DE LA RECHERCHE SCIENTIFIQUE, Paris (FR); UNIVERSITE MONTPELLIER II SCIENCES ET TECHNIQUES, Montpellier (FR)

(72) Inventors: Jean Chery, St Clement de Riviere (FR); Philippe Collard, Montpellier (FR)

(73) Assignees: CENTRE NATIONAL DE LA RECHERCHE SCIENTIFIQUE, Paris (FR); UNIVERSITE MONTPELLIER III SCIENCES ET TECHNIQUES, Montpellier (FR)

( * ) Notice: Subject to any disclaimer, the term of this patent is extended or adjusted under 35 U.S.C. 154(b) by 88 days.

(21) Appl. No.: 14/379,383

(22) PCT Filed: Feb. 19, 2013

(86) PCT No.: PCT/EP2013/053251
§ 371 (c)(1),
(2) Date: Aug. 18, 2014

(87) PCT Pub. No.: WO2013/124261
PCT Pub. Date: Aug. 29, 2013

(65) Prior Publication Data
US 2015/0040412 A1    Feb. 12, 2015

(30) Foreign Application Priority Data
Feb. 22, 2012    (FR) .................................... 12 51622

(51) Int. Cl.
*G01C 9/14* (2006.01)
*G01C 9/06* (2006.01)
*G01V 1/00* (2006.01)

(52) U.S. Cl.
CPC . *G01C 9/14* (2013.01); *G01C 9/06* (2013.01); *G01V 1/008* (2013.01)

(58) Field of Classification Search
CPC ........................................................ G01C 9/14
USPC ........................................ 33/366.24, 304, 1 H
See application file for complete search history.

(56) References Cited

U.S. PATENT DOCUMENTS 2,365,999 A * 12/1944 Boucher ........... E21B 47/02232
33/312
2,921,380 A * 1/1960 Savet ....................... G01C 9/08
33/303

(Continued)

FOREIGN PATENT DOCUMENTS

| CH | 682016 A5 * | 6/1993 | .............. G01C 9/06 |
|---|---|---|---|
| FR | 1056230 A | 2/1954 | |
| WO | 9010193 A1 | 9/1990 | |

*Primary Examiner* — Christopher Fulton
(74) *Attorney, Agent, or Firm* — Im IP Law PLLC; C. Andrew Im (57) ABSTRACT

An inclinometer for measuring a change in the inclination of a structure from a given initial position. The inclinometer comprises a frame, a pendulum and at least three distance-measuring device. The frame is rigidly connected to the structure such that the inclination of the frame has the same changes in inclination as the structure. The pendulum is freely suspended from the frame and comprises a first end attached to the frame and a freely moving opposite end. The distance-measuring devices at the frame have respective coplanar measuring axes converging at a single point. Each measuring device measures a change in the distance separating same from the pendulum.

8 Claims, 2 Drawing Sheets

(56) References Cited

U.S. PATENT DOCUMENTS

| | | | | |
|---|---|---|---|---|
| 3,935,643 A * | 2/1976 | Russell | .................... | G01C 9/06 324/207.18 |
| 3,938,255 A * | 2/1976 | Lichte, Jr. | ................ | G01C 9/14 33/311 |
| 4,401,888 A * | 8/1983 | West | .................... | G05D 1/0875 114/126 |
| 4,686,653 A * | 8/1987 | Staron | ................ | E21B 17/1021 175/99 |
| 4,812,654 A * | 3/1989 | Araujo | .................... | G01C 9/14 250/338.1 |
| 4,949,467 A * | 8/1990 | Oman | .................... | G01C 9/14 248/188.3 |
| 6,594,912 B2 * | 7/2003 | Ashjaee | .................... | G01C 9/06 33/365 |
| 6,665,062 B2 * | 12/2003 | Ferdinand | ............ | G01B 11/165 356/139.1 |
| 7,210,242 B2 * | 5/2007 | Sun | .................... | G01C 15/00 33/366.24 |
| 8,113,041 B2 * | 2/2012 | DiFoggio | ................ | E21B 47/04 73/152.05 |
| 2005/0007125 A1 | 1/2005 | Heger | | |

\* cited by examiner

Section AA

INCLINOMETER

RELATED APPLICATIONS

This application is a §371 application from PCT/EP2013/053251 filed Feb. 19, 2013, which claims priority from French Patent Application No. 12 51622 filed Feb. 22, 2012, each of which is herein incorporated by reference in its entirety.

TECHNICAL FIELD OF THE INVENTION

The present invention relates to an inclinometer, that is to say a device intended to measure variations of inclination of structures. The invention is especially usable in boreholes, in the civil engineering sector, for monitoring works of art and buildings, and generally wherever precise checking of the stability of a structure is required, particularly over the long term.

BACKGROUND OF THE INVENTION

Measurements of the variation in the inclination of structures are frequent and carried out especially in the case of the measurement of geophysical deformations, more specifically of seismic deformations. Such measurements are also performed to forestall a possible danger of collapse of buildings or of a part of the latter, or else to track the evolution of the storage of fluids in geological storage sites and the migration of these fluids into the permeable layer.

During an earthquake, in fault zones, the movement of geological faults occurs rapidly. The detection of these movements is easy. Between two earthquakes, deformations exist but are very small and very slow. Now, these deformations are coupled with seismic activity and the detection of these deformations is indispensable for understanding the mechanism of faults in the Earth's crust. Measurement instruments which are very precise and reliable over the long term must therefore be called upon.

At the present time very few devices capable of carrying out the measurement of these small deformations over the long term exist on the market. The known current devices are generally bubble inclinometers, such as for example the Lily borehole inclinometer from Applied Geomechanics (trademark), which allow the measurement of these deformations on the basis of the measurement of variations in inclination in boreholes sunk into the Earth's crust.

OBJECT AND SUMMARY OF THE INVENTION

The present invention proposes a new device allowing precise measurements of variations in the inclination of a structure.

An objective of the present invention is to provide a device suitable for measurements of variations in inclination over time addressing constraints of size, of performance and of cost rendering its use realistic in an industrial setting.

These objectives, as well as others which will become apparent subsequently, are attained according to the invention by virtue of an inclinometer for the measurement of a variation in inclination of a structure from a given initial position, comprising:

a framework intended to be secured rigidly and fixedly to the structure so that the inclination of the framework varies identically to the structure, and a pendulum suspended freely from the framework, comprising a first end fixed to the framework and an opposite end which is free to move.

The inclinometer comprises, at the level of the framework, at least three distance measurement devices disposed so as to exhibit, in a plane, respective measurement axes which are coplanar and concurrent at one and the same point, each measurement device measuring a variation in distance separating it from the pendulum.

The inclinometer is based on the measurement of the movement of the pendulum subject to the Earth's gravity, that is to say which tends to remain oriented vertically. "Vertically" will be understood to mean the direction substantially parallel to the gravitational force. Likewise, "horizontally" will be understood to mean the direction substantially perpendicular to the gravitational force.

When the structure deforms, it gives rise to a variation in inclination with respect to the initial position of the framework which is rigidly secured to it while the pendulum, for its part, remains vertical. The relative movement between the framework in the initial position and the pendulum advantageously makes it possible to measure the variation in inclination of the structure.

The measurement of the displacement of the pendulum with respect to the framework in at least three coplanar distinct directions, obtained through the distance measurements acquired by the measurement devices, makes it possible to reconstruct in a precise manner the inclination of the framework with respect to the pendulum.

The inclinometer is advantageously intended for the measurement of geophysical deformations, of geological storage reservoirs and for civil engineering applications (deformation of civil engineering works) for which precise checking of the stability of a structure is required, particularly over the long term.

According to preferred embodiments, the invention furthermore addresses the following characteristics, implemented separately or in each of their technically operative combinations.

In preferred embodiments of the invention, the so-called measurement plane, in which the measurement axes of the measurement devices are situated, is a plane perpendicular to a so-called reference axis corresponding to an axis of symmetry of the pendulum when the framework is in the initial position.

According to an advantageous characteristic of the invention, in order to improve the precision in the measurement of the distances, the distance measurement devices are disposed substantially at the level of the free end of the pendulum.

In an entirely advantageous manner, the measurement axes of the coplanar respective distance measurement devices are not pairwise collinear.

In preferred embodiments of the invention, to optimize the calculations for measuring the displacement of the pendulum in the measurement plane, the inclinometer comprises three measurement devices disposed on the framework so as to exhibit three coplanar respective measurement axes forming between themselves an angle substantially equal to 120°.

In preferred embodiments of the invention, in order to minimize the drift of the measurement system, the distance measurement devices are fiber optic devices coupled to a common luminous source.

The invention also relates to a measurement system comprising an inclinometer such as set forth above in at least one of its embodiments and means for determining the variation in inclination of the framework on the basis of the values logged by the distance measurement devices.

The redundancy of the data measured via the at least three measurement devices allows inter alia intrinsic estimation of the measurement system and compensation of its drifts.

The invention also relates to the use of the measurement system in the measurement of geophysical deformations.

The characteristics and advantages of the invention will be better appreciated by virtue of the description which follows, which description sets forth the characteristics of the invention through a nonlimiting exemplary application.

BRIEF DESCRIPTION OF THE DRAWINGS

The description is supported by the appended figures in which.

DETAILED DESCRIPTION OF THE EMBODIMENTS

Figure 1:
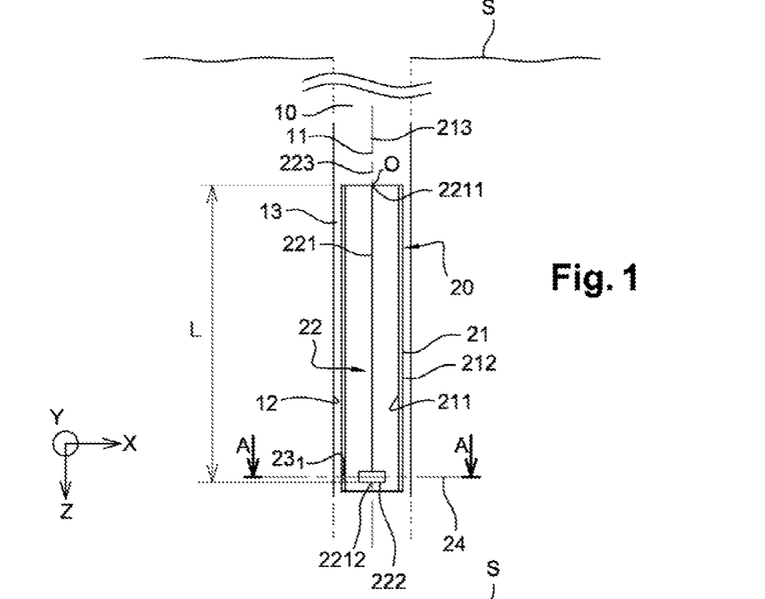
FIG. 1 schematically illustrates the principle of a particular embodiment of the inclinometer which is the subject of the invention placed in a borehole, for a given initial position, FIG. 2 schematically illustrates the principle of a particular embodiment of the inclinometer which is the subject of the invention placed in a borehole, for an inclined position obtained subsequent to a deformation of the surrounding medium.

An exemplary measurement system, in accordance with the invention, for measuring variation in inclination of a structure comprises an inclinometer 20 schematically represented in FIG. 1.

In the example presented, this structure is the Earth's crust in which a deep vertical borehole 10 has been drilled and into which the inclinometer 20 is introduced. The exemplary embodiment of the inclinometer is described in detail in its application in the case of a measurement of variation in inclination of the borehole for seismological applications. This choice is not limiting and the invention also applies to other applications, such as for example in the civil engineering sector.

Throughout the subsequent description, unless stated otherwise, at the level of the borehole made starting from a ground soil S, the terms horizontal and vertical will be defined with reference to the Earth's gravity. The term "vertical" therefore designates a direction substantially parallel to an acceleration vector of the Earth's gravity, while the term "horizontal" designates a direction substantially perpendicular to the vertical thus defined. The vertical axis is represented by the Z axis of an XYZ orthonormal reference frame in space illustrated in FIG. 1. The terms "top", "bottom", "upper" and "lower" refer to the vertical direction Z of the XYZ reference frame. Thus, the terms "top" and "upper" designate a direction directed toward the ground soil S, while the terms "bottom" and "lower" designate a direction in the opposite sense.

The borehole 10 is preferably of cylindrical shape, with longitudinal axis of symmetry 11, and exhibits a typical diameter of the order of 7 to 13 cm, generally 10 cm.

The borehole 10 can attain a typical depth of several thousands of meters with respect to the ground soil S.

In the example of FIG. 1, the borehole 10 is vertical, that is to say with a longitudinal axis of symmetry 11 exhibiting a zero angle of inclination with respect to the vertical axis Z. This vertical position where the longitudinal axis of symmetry 11 exhibits a zero angle of inclination with respect to the vertical axis Z subsequently defines a given initial position of the borehole.

Figure 2:
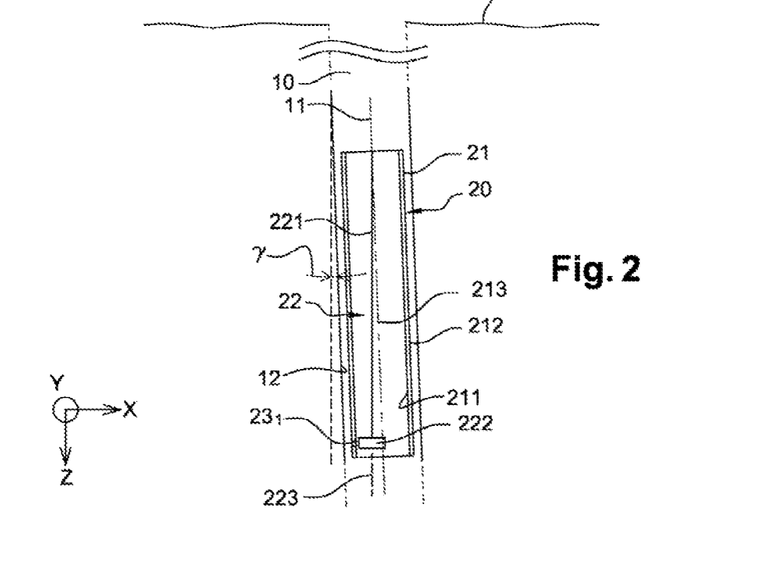

In the example of FIG. 2, the longitudinal axis of symmetry 11 of the borehole 10 is inclined by a non-zero angle γ with respect to the vertical axis Z, subsequent to a deformation of the Earth's crust, hereinafter the so-called surrounding medium.

The inclinometer 20 comprises a rigid hollow longitudinal framework 21, that is to say exhibiting a negligible deformation during its implantation in the borehole 10, comprising an inner longitudinal wall 211 and an outer longitudinal wall 212. Said outer longitudinal wall is intended to be opposite an inner wall 12 of the borehole 10 when the inclinometer 20 is introduced into said borehole, as illustrated in FIGS. 1 and 2.

The framework 21 is advantageously closed at top and bottom ends so as to render it air-tight and fluid-tight.

In a preferred exemplary embodiment, the framework 21 exhibits a cylindrical shape to correspond to the cylindrical shape of the borehole, and of smaller diameter than the diameter of the borehole so as to be able to be inserted into the borehole without difficulty.

In an exemplary embodiment, the framework exhibits a length of 1 m and a diameter of 8 cm.

The framework 21 exhibits a longitudinal axis of symmetry 213 substantially parallel, preferably identical, to the longitudinal axis of symmetry 11 of the borehole 10, when the inclinometer is in a fixed position in the borehole 10, that is to say when the inclinometer is fixedly secured to the borehole.

The framework 21 of the inclinometer 20 is intended to be installed in the borehole several hundreds or thousands of meters from the ground soil S. The temperatures there being greater than at the level of the ground soil S, (it is known to the person skilled in the art that the temperature rises by substantially 2° C. every 100 m of depth from the ground soil S), the framework 21 of the inclinometer is chosen from a material resistant to high temperatures, for example in a range going from 50° C. to 250° C.

In a preferred exemplary embodiment, in order to minimize the temperature effects, the framework 21 is made of Pyrex.

In order to secure the inclinometer 20 fixedly to the borehole 10, and consequently to the surrounding medium, a space 13 lying between the outer longitudinal wall 212 of the framework 21 and the inner longitudinal wall 12 of the borehole 10 is filled in. Thus, the borehole inclinations, due to deformations of the surrounding medium, induce an identical inclination of the framework of the inclinometer.

In an exemplary embodiment, the space 13 is filled with cement mortar.

In another exemplary embodiment, the space 13 is filled in with solid particles, for example micro-balls, preferably made of silica so as to resist compression and to resist high temperatures.

The inclinometer 20 furthermore comprises, inside the framework 21, in an enclosure delimited by the inner longitudinal wall 211, a suspended vertical pendulum 22, generally dubbed a simple pendulum.

The pendulum 22 comprises a flexible rod 221 of which a first end, termed the upper end 2211, is secured to the top end of the framework 21 around a fixed point O.

Here, flexible rod is understood to mean a rod which allows the preservation of an essentially vertical direction, that is to say one along the axis Z, during the use of the pendulum.

The rod 221 of the pendulum comprises at one end, the so-called lower end 2212, opposite from the upper end 2211, a mass 222 for placing said rod under tension. The rod 221 is thus sensitive to gravity and tends to remain oriented vertically along the Z axis. By virtue of the mass 222, the rod 221 forms a pendulum suspended freely from the framework by way of the fixed point O.

In an exemplary embodiment, the mass 222 of the pendulum 22 is a cylinder, of substantially smaller diameter than an inner diameter of the framework.

Preferably, the pendulum 22 exhibits a longitudinal axis of symmetry 223 substantially identical to that of the longitudinal axis of symmetry 213 of the framework 21, when the framework and the borehole are in the initial position.

A deformation of the surrounding medium gives rise to a variation in inclination of the framework of the inclinometer which induces a displacement of the pendulum inside the framework, with respect to the axis of symmetry of the framework. The angular variation of the framework is conveyed through the relative movement between the pendulum and the framework.

Thus, when the borehole 10 is in the initial position, that is to say vertical, as illustrated in FIG. 1, the pendulum 22 is vertical and of axis 223 parallel to the axis of symmetry 11 of the borehole 10.

When the borehole 10 exhibits an angle of inclination $\gamma$ subsequent to a deformation of the surrounding medium, as illustrated in FIG. 2, the pendulum 22 remains substantially vertical and exhibits an angle $\gamma'$ substantially smaller than $\gamma$ with respect to the longitudinal axis of symmetry of the framework 21 and of the borehole 10.

The pendulum 22 is chosen on the one hand from a sufficiently flexible material as to approximate a so-called perfect pendulum (corresponding to a mass attached to an inextensible thread of negligible mass rotating without friction in vacuo about a fixed axis), and for which $\gamma'=\gamma$.

The pendulum 22 is chosen on the other hand from a material resistant to high temperatures, just as for the framework 21.

In a preferred exemplary embodiment, the pendulum 22 (mainly the rod) is made of Pyrex.

A length L of the rod is chosen on the one hand so that the inclinometer 20 exhibits a sufficient angular sensitivity to detect slow deformations, in this instance an angular sensitivity at least equal to $10^{-7}$ rad. As it will be explained in the subsequent description, the angular sensitivity of the inclinometer is proportional to the length of the rod.

Moreover, the length of the rod is chosen so that the inclinometer exhibits reduced size and bulk so as to render it readily transportable and easily handled.

In an exemplary embodiment, the rod exhibits a length of substantially between 0.8 m and 1.2 m, preferably, for example equal to 0.87 m.

Figure 3:
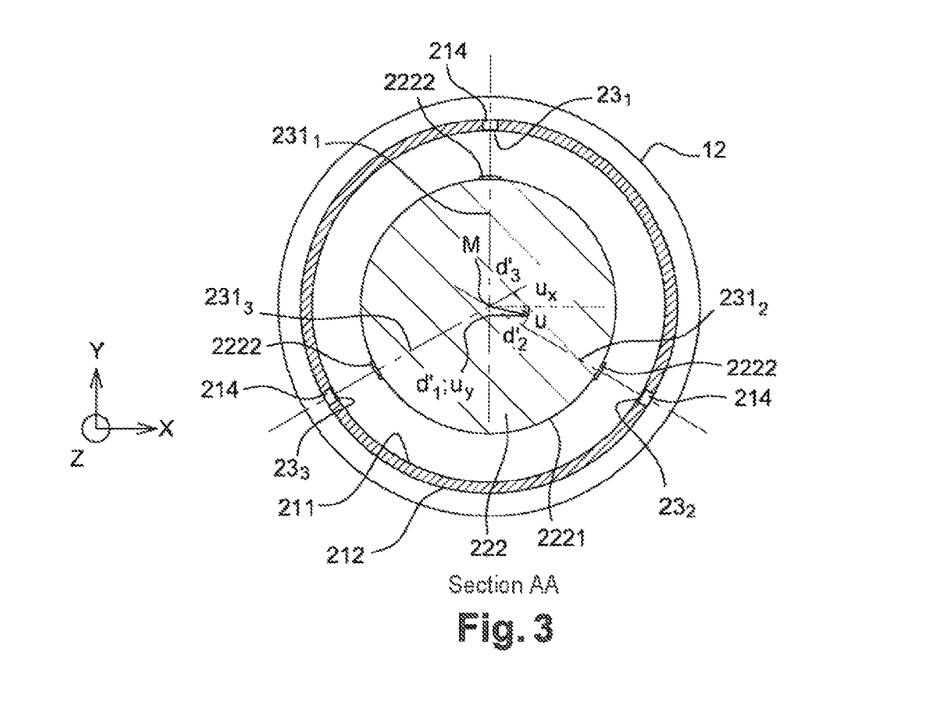
FIG. 3 is a sectional view of FIG. 1, in a measurement plane, and schematically illustrates an exemplary positioning of three distance measurement devices of the inclinometer.

The inclinometer furthermore comprises, as illustrated in FIG. 3, in reception housings 214 made in a thickness of the framework 21 between the inner 211 and outer 212 longitudinal walls, three distance measurement devices $23_1$, $23_2$, $23_3$. Each distance measurement device $23_1$, $23_2$, $23_3$ measures a variation in distance, or displacement, $d_1$, $d_2$, $d_3$, separating it from the pendulum 22.

The three measurement devices $23_1$, $23_2$, $23_3$ are positioned in such a way that they exhibit coplanar respective measurement axes $231_1$, $231_2$, $231_3$.

Preferably, the three respective measurement axes $231_1$, $231_2$, $231_3$ of the three measurement devices are situated in a plane, the so-called measurement plane 24, perpendicularly to a so-called reference axis, corresponding to an axis of symmetry 223 of the pendulum 22 when the framework 21 is in the initial position, that is to say corresponding to the axis of symmetry 213 of the framework 21.

The measurement plane 24 is defined by the axes X and Y which define with the vertical axis Z the XYZ orthonormal reference frame.

Advantageously, the three measurement axes $231_1$, $231_2$, $231_3$ are concurrent at one and the same point.

In a preferred embodiment, the three measurement axes $231_1$, $231_2$, $231_3$ are concurrent at a point M, the point of intersection of the measurement plane 24 with the axis of symmetry 213 of the framework 21.

Preferably, the measurement axes $231_1$, $231_2$, $231_3$ of the measurement devices $23_1$, $23_2$, $23_3$ are not pairwise collinear.

In a preferred example, illustrated by FIG. 3, the three measurement devices $23_1$, $23_2$, $23_3$ are distributed over the framework 21 in a manner angularly equidistant from one another by 120°.

In a preferred exemplary embodiment, each measurement device $23_1$, $23_2$, $23_3$ is disposed so as to measure the displacement between an outer face 2221 and the mass 222.

The three distance measurement devices $23_1$, $23_2$, $23_3$ make it possible to measure at any instant a displacement u of the mass of the pendulum, in the measurement plane defined by the axes XY, on the basis of a reference position, when the framework and the borehole are in the initial position.

A displacement u of the pendulum 22 in the measurement plane 24, due to a deformation of the surrounding medium, is very small with respect to the length L of the pendulum 22. The measurement devices $23_1$, $23_2$, $23_3$ are therefore chosen so as to be able to measure very small displacements, in this instance of the order of at least $10^{-9}$ m.

Indeed, it is known to the person skilled in the art that, in the case of a perfect pendulum, the angular sensitivity of the inclinometer is proportional to the length L of the pendulum (equivalent to the length of the rod). The measurement of a displacement u of the pendulum in the measurement plane 24 makes it possible to measure an angular variation equal to $$\frac{u}{L}.$$

In me case OT a real pendulum exhibiting having a certain rigidity, a displacement u'=Ru is measured, where R is a coefficient dependent on a coefficient of flexibility of the rod, R generally being less than 1. In this case, the angular sensitivity S of the inclinometer is equal to S=L.R. Calibration of the inclinometer makes it possible to calculate the constant R precisely.

In an exemplary calculation, for a pendulum of length L=1 m and close to ideal behavior, that is to say a coefficient R close to 1, the angular sensitivity of the inclinometer will be close to 1. Thus, the measurement of a displacement of the pendulum 22 in the measurement plane 24 of 0.1 μm will therefore correspond to a variation in inclination of $10^{-7}$ rad and the measurement of a displacement of the pendulum 22 in the measurement plane 24 of 1 nm will correspond to a variation in inclination of $10^{-9}$ rad.

Current measurement devices being capable of measuring $10^{-9}$ m, the angular sensitivity of the inclinometer can attain $10^{-9}$ rad.

In one embodiment, the distance measurement devices $23_1$, $23_2$, $23_3$ are capacitive devices.

In a preferred embodiment, the distance measurement devices $23_1$, $23_2$, $23_3$ are optical devices.

In an exemplary embodiment of an optical measurement device, it is possible to cite the extrinsic optical fiber measurement device described in French patent application FR 1056230, whose content is entirely incorporated here by reference.

Each measurement device $23_1$, $23_2$, $23_3$ comprises (not represented in the figures):
- a luminous source, of central wavelength $\lambda_0$, preferably a laser luminous source, for generating a light beam toward the mass 222,
- an optical fiber, termed measurement fiber, for transporting and guiding the light beam toward the mass 222, an end of said measurement fiber, fixed on the framework and placed facing the mass, forming with the outer face 2221 of the mass 222 a Fabry-Pérot optical cavity,
- a means for detecting an interferometric signal, said interferometric signal comprising the information on the displacement of the mass of the pendulum with respect to the end of the measurement fiber, and being generated by interference between a reference light beam and a measurement beam, said reference light beam corresponding to a fraction of the light beam issuing from the luminous source which is reflected by the end of the fiber, and said measurement light beam corresponding to a fraction of the light beam issuing from the luminous source which is reflected by the mass 222 and which traverses an optical path in the Fabry-Pérot cavity whose variation is dependent on the distance to be determined.

The mass 222 comprises, preferably, at the level of its outer face 2221, opposite each fiber end, a mirror 2222, of longitudinal axis substantially parallel to the axis of symmetry 213 of the framework 21, so as to reflect the measurement light beam in a maximal manner.

In a variant embodiment, to compensate for small variations in wavelength between luminous sources, the three measurement devices exhibit a common luminous source. The beam issuing from the common luminous source is split, via a 1*3-pathway coupler, into three beams, each beam propagating, via a fiber, toward a coupler and then toward a measurement fiber and a Fabry-Pérot optical cavity formed by the end of the measurement fiber and a mirror.

The system for measuring a variation in inclination furthermore comprises means (not represented) for determining the variation in inclination of the framework, such as a processing or control unit, preferably incorporated in the inclinometer or a processor based device, e.g., a laptop, personal computer, personal digital assistant, smart phone, or any portable handheld device, and consequently of the borehole, on the basis of the interferometric signals measured by the detector or means of detection of the measurement devices.

Principle of Inclination Measurement

The mass 222 of the pendulum 22 moves on a sphere which can be regarded as a plane, the measurement plane 24, for small oscillations. The pendulum 22 performing a movement in the measurement plane 24, the measurement of two displacements along two non-collinear directions between the framework and the mass makes it possible to calculate the displacement of the mass in the measurement plane.

Three measurements of displacements $d_1$, $d_2$, $d_3$ along three axes (in the same measurement plane), for example at 120°, make it possible to obtain additional information with respect to the measurement of two displacements, such as for example a determination of the variations of common physical origin of the measured displacements, a determination of the components of the displacement of the pendulum, or else an estimation of the precision of the positioning of the pendulum in X and Y.

The measured displacements $d_1$, $d_2$, $d_3$ correspond to the distance variations measured between the outer face 2221 of the mass 222 of the pendulum 22 and the measurement devices $23_1$, $23_2$, $23_3$ secured to the framework 21.

A distance variation corresponds to the difference between a distance measured by the measurement device and a so-called reference distance measured when in the pendulum is in the reference position.

In the subsequent description, the displacement $d_1$, respectively $d_2$, $d_3$, is reckoned positive when the distance between the framework and the mass increases, therefore a positive distance variation, and is reckoned negative when the distance between the framework and the mass decreases, therefore a negative distance variation.

In fact, the displacements measured $d_1$, $d_2$, $d_3$ by the measurement devices $23_1$, $23_2$, $23_3$ are dependent on variations (due to a drift of the measurement system over time) having a common physical origin. In an exemplary real case, these variations may result for example from a thermal expansion of the measurement system, or from a variation in wavelength of the measurement devices $23_1$, $23_2$, $23_3$, when they are optical devices. These common variations of the measurement system correspond to one and the same apparent displacement, denoted C, on the 3 measurement axes. Reduced measurements $d'_1$, $d'_2$, $d'_3$, corresponding to what would be measured in the absence of this variation common to the three measurements, and therefore corresponding to the real displacement of the mass of the pendulum, are therefore such that $d'_i = d_i - C$.

Let $u_x$ and $u_y$ be the components of the sought-after displacement u of the mass 222 of the pendulum 22 along the axes X and Y in the measurement plane 24.

By convention, the measurement axis of one of the three measurement devices is in the Y axis. In the example described in FIG. 3, the measurement axis $231_1$ of the device 231 is in the Y axis.

Figure 4:
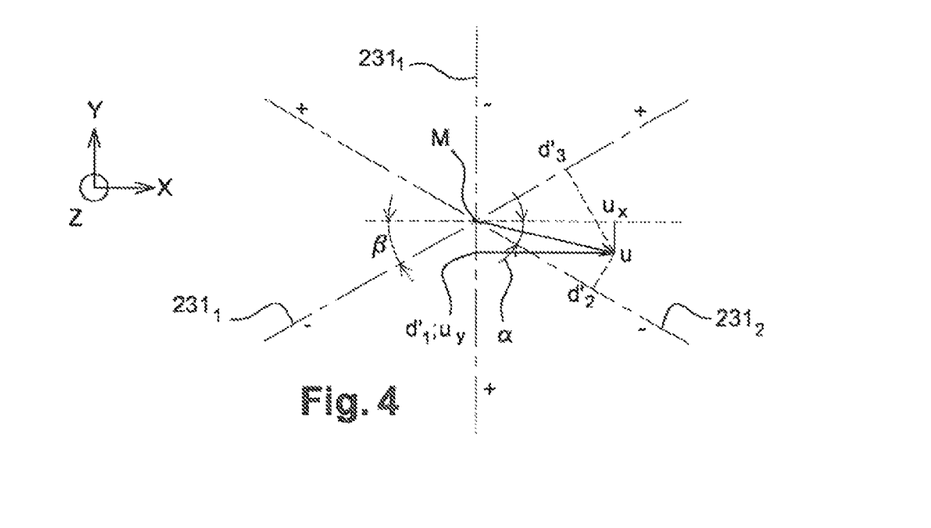
FIG. 4 presents a magnification of a part of FIG. 3.

If arbitrary mutual relative positionings of the measurement devices on the framework are considered, such as for example illustrated in FIGS. 3 and 4, the relations between these components $u_x$, $u_y$, of the displacement u of the pendulum and the measured displacements $d_1$, $d_2$, $d_3$ may be written:

$$-u_y = d_1 - C$$

$$-\cos \alpha \cdot u_x + \sin \alpha \cdot u_y = d_2 - C$$

$$+\cos \beta \cdot u_x + \sin \beta \cdot u_y = d_3 - C \qquad (1)$$

where $\alpha$ corresponds to the angle formed between the measurement axis $231_2$ of the measurement device $23_2$ and the X axis and $\beta$ corresponds the measurement axis $231_3$ of the measurement device $23_3$ and the X axis.

It is then possible to calculate the expressions for the components $u_x$ and $u_y$ of the displacement u of the pendulum.

Three expressions are possible for determining the component $u_x$:

$$u_{x,1} = -\frac{d_2 - C + (d_1 - C) \cdot \sin\alpha}{\cos\beta} \quad (2a)$$

$$u_{x,2} = \frac{d_3 - C + (d_1 - C) \cdot \sin\beta}{\cos\beta}$$

$$u_{x,3} = \frac{(d_3 - C) \cdot \sin\alpha - (d_2 - C) \cdot \sin\beta}{\sin\alpha \cdot \cos\beta + \sin\beta \cdot \cos\alpha}$$

Two expressions are possible for determining the component $u_y$:

$$u_{y,1} = -(d_1 - C) \quad (2b)$$

$$u_{y,2} = \frac{(d_3 - C) \cdot \cos\alpha + (d_2 - C) \cdot \cos\beta}{\sin\alpha \cdot \cos\beta + \sin\beta \cdot \cos\alpha}$$

Prior to the calculation of the components $u_x$ and $u_y$, it is necessary to calculate the parameters $\alpha$, $\beta$ and C:

The angles $\alpha$ and $\beta$ are considered to be constants of the measurement system and are determinable for example by calibration, over a sufficiently small time interval, for example of the order of about ten seconds, the term C is considered to be slowly varying, for example of the order of 10 nm per hour, and may be regarded as a constant term.

The redundancy of the measured data (three in number: the displacements $d_1$, $d_2$, $d_3$) with respect to the unknowns (two in number: the components $u_x$ and $u_y$) affords the measurement system particular properties which allow its calibration, that is to say the calculation of $\alpha$ and $\beta$, and the calculation of the temporal evolution of the apparent displacement C.

a) Calibration of the Measurement System

In one embodiment, in order to determine the exact values of $\alpha$ and $\beta$, a data sample measured over a determined time interval is considered. In a practical exemplary embodiment, this interval is of the order of about ten seconds, and the measured displacements $d_1$, $d_2$, $d_3$ are recorded every 0.01 seconds. Over this interval, the apparent displacement C is chosen in such a way that the sum of the reduced displacements $$\sum_{i=1}^{3} d'_i = \sum_{i=1}^{3} (d_i - C)$$

has zero value on average during this time interval. A dispersion between the three values, given on the basis of the three expressions of (2a), of the component $u_x$ is then observed as a function of the values of the angles $\alpha$ and $\beta$. Likewise, a dispersion between the two values, given on the basis of the two expressions of (2b), of the component $u_y$ appears. It is then possible to find the values of the angles $\alpha$ and $\beta$ which lead to a minimum value of the root mean square deviations $e_x$ and $e_y$ associated with a vector u. By putting for the mean values of the displacement $$\bar{u}_x = \frac{1}{n} \sum_{j=1}^{n} u_{x,j}$$

(with n=3) and $$\bar{u}_y = \frac{1}{n} \sum_{j=1}^{n} u_{y,j}$$

(with n=2), we obtain for the root mean square deviations $$e_x = \sqrt{\frac{1}{n} \sum_{j=1}^{n} (u_{x,j} - \bar{u}_x)^2}$$

(with n=3) and $$e_y = \sqrt{\frac{1}{n} \sum_{j=1}^{n} (u_{y,j} - \bar{u}_y)^2}$$

(with n=2).

By applying this procedure to successive data samples, the optimal values of the angles $\alpha$ and $\beta$ can be calculated very precisely.

b) Determination of the Apparent Displacement C

In one embodiment, equations 2a and 2b are considered below with the optimal values, obtained for example as hereinabove, of the angles $\alpha$ and $\beta$. It is easy to show that the variation of C modifies the dispersion of the values of the components $u_x$ and $u_y$. By using a data sample as above, it is possible to find the optimal value of C which minimizes the root mean square deviations associated with the vector u.

c) Determination of the Components of the Displacement

Once the angles $\alpha$ and $\beta$ are known, as well as the value of C for each time interval, it is possible to precisely calculate the components $u_x$ and $u_y$ of the displacement u of the pendulum in the measurement plane, corrected for the common variations of the measurement system, by using the mean value of expressions (2a) and (2b).

d) Estimation of the Intrinsic Precision of the Positioning of the Pendulum in X and in Y The root mean square deviations $e_x$ and $e_y$ associated with the values of the components $u_x$ and $u_y$, obtained using the equations (2a) and (2b), for values $\alpha$, $\beta$ and C determined previously, make it possible to calculate the intrinsic precision of the positioning of the mass of the pendulum in X and in Y.

In the particular exemplary embodiment where the measurement axes of the measurement devices $23_1$, $23_2$, $23_3$, form between themselves an angle substantially equal to 120°, that is to say the measurement system is symmetric, the angles $\alpha$ and $\beta$ are equal to 30°.

In this case, the relations between the components $u_x$, $u_y$, of the displacement u and the measured displacements $d_1$, $d_2$, $d_3$ are given by the scalar product between (ux, uy) and the direction vectors of the optical axes which are (0,−1), (−cos 30°, sin 30°), (cos 30°, sin 30°) for the axes $231_1$, $231_2$, $231_3$ respectively.

The following equations are deduced therefrom:

$$-u_y = d_1 - C$$

$$-u_x \cdot \cos 30 + u_y \cdot \sin 30 = d_2 - C$$

$$u_x \cdot \cos 30 + u_y \cdot \sin 30 = d_3 - C \quad (3)$$

On the basis of these three equations, it is possible to determine the components $u_x$ and $u_y$.

Three expressions are possible for determining the component $u_x$:

$$u_x = -\frac{(d_2 - C) + (d_1 - C) \cdot \sin 30}{\cos 30} \quad (4a)$$

$$u_x = \frac{(d_3 - C) + (d_1 - C) \cdot \sin 30}{\cos 30}$$

$$u_x = \frac{d_3 - d_2}{2\cos 30}$$

Two expressions are possible for determining the component $u_y$:

$$u_y = -(d_1 - C)$$

$$u_y = d_2 + d_3 - 2C \quad (4b)$$

The deviations between the values obtained for the components $u_x$ and $u_y$ by using equations (4a) and (4b) always make it possible to determine the intrinsic precision of the positioning of the pendulum in X and in Y.

Compensation for the drifts of the measurement system, via the measurement of the apparent displacement C, is also possible.

It is interesting to note that, when the measurement system is symmetric, said measurement system possesses an invariant displacement $\bar{d} = d_1 + d_2 + d_3$ equal to 3 C, thereby allowing direct measurement of the apparent displacement C, and therefore of the drifts of the measurement system for a series of data. In this case, by putting $$\sin(30°) = 0.5 \text{ and } \cos(30°) = \frac{\sqrt{3}}{2},$$

the components $u_x$ and $u_y$ of the displacement u of the pendulum are expressed in a unique manner:

$$u_x = \frac{1}{\sqrt{3}}(d_3 - d_2) \quad (5)$$

$$u_y = -(d_1 - C)$$

The measurement devices are advantageously three in number, as illustrated in FIG. 3. Although the number of measurement devices illustrated in FIG. 3 and described is three, the number of these measurement devices is not limited to that described and illustrated. Thus, it is possible, without departing from the scope of the invention, to make a measurement system comprising more than three measurement devices and exhibiting the same advantages (determination of the apparent displacement and of the components of the displacement of the pendulum, estimation of the precision of the positioning of the pendulum in X and Y) as for a measurement system with three measurement devices. A number of measurement devices beyond three advantageously makes it possible to obtain greater redundancy of the measurements obtained. The calculations for retrieving the displacement of the pendulum in the measurement plane are within the capability of the person skilled in the art.

The description hereinabove clearly illustrates that by its various characteristics and their advantages, the present invention attains the objectives that it set itself. In particular, it provides a measurement system which makes it possible to circumvent the deformations specific to the measurement system and to its drift. The inclinometer exhibits a reduced size so that it is readily transportable and easy to use, hence the possibility of use in drilling at various depths. It is advantageously made from a heat resistant material, so as to exhibit a significant lifetime. This criterion is particularly significant since the measurement system is required to measure the variations in inclination of a structure over a period extending over several years.

Its constituent materials allow it to resist heat. On account of the compensated drift of the measurement system according to the invention, the measurement system allows tracking over the long term, for example over a period extending over several days, months and/or years.

The deployment of several measurement systems in the vicinity of a fault advantageously allows small slow depth-wise movements to be detected in a reliable manner.

The invention is described in the case of a seismological application. The invention is also applicable to the monitoring of geological storage sites. Indeed, certain permeable geological systems covered by leaktight formations make it possible to store fluids such as for example carbon dioxide, natural gas or else water. In response to this storage, the geological system deforms slightly. Measurement of these deformations with the aid of inclinometers according to the invention installed in boreholes makes it possible to track the evolution of the storage and the migration of the fluids into the permeable layer. On account of the compensated drift of the measurement system according to the invention, the measurement system allows the tracking of storage over the long term, for example over a period extending over several days, months and/or years. The measurement system implementation in this application is within the remit of the person skilled in the art.

The invention claimed is:

1. An inclinometer for measuring a variation in an inclination of a structure from a given initial position, comprising:
    a framework secured rigidly to a borehole of the structure so that the inclination of the framework varies substantially identical to the structure, the framework is closed at top and bottom ends thereof, the framework comprises at least three reception housing between inner and outer longitudinal walls of the framework;
    a pendulum suspended freely from the framework, comprising a first end fixed to the top end of the framework and a free end, opposite the first end, which is free to move; and
    at least three distance measurement devices positioned within a respective reception housing of the framework, at a level of the framework, exhibiting respective measurement axes which are coplanar and concurrent at one and the same point, each measurement device measuring a variation in distance separating it from the pendulum.

2. The inclinometer as claimed in claim 1, wherein a measurement plane in which the measurement axes of the measurement devices are situated is a plane perpendicular to a reference axis corresponding to an axis of symmetry of the pendulum when the framework is in an initial position.

3. The inclinometer as claimed in claim 1, wherein the distance measurement devices are disposed substantially at the level of the free end of the pendulum.

4. The inclinometer as claimed in claim 1, wherein the coplanar respective measurement axes are not pairwise collinear.

5. The inclinometer as claimed in claim 1, wherein the three measurement devices exhibiting three coplanar respective measurement axes are substantially angularly equidistant from each other by 120°.

6. The inclinometer as claimed in claim 1, wherein the distance measurement devices are fiber optic devices coupled to a common luminous source.

7. A measurement system comprising an inclinometer as claimed in claim 1; and further comprising a processing unit for determining the variation in inclination of the framework based on values logged by the distance measurement devices.

8. Method of measuring geophysical deformations, comprising the steps of:
measuring a variation in an inclination of a structure from a given initial position utilizing:
a framework secured rigidly to a borehole of the structure so that the inclination of the framework varies substantially identical to the structure, the framework is closed at top and bottom ends thereof, the framework comprises at least three reception housing between inner and outer longitudinal walls of the framework;
a pendulum suspended freely from the framework, comprising a first end fixed to the top end of the framework and a free end, opposite the first end, which is free to move; and
at least three distance measurement devices positioned within a respective reception housing of the framework, at a level of the framework, exhibiting respective measurement axes which are coplanar and concurrent at one and the same point;
measuring a variation in distance separating the pendulum from each measurement device; and
determining the variation in inclination of the framework based on values logged by the distance measurement devices by a processing unit.

* * * * *

UNITED STATES PATENT AND TRADEMARK OFFICE
CERTIFICATE OF CORRECTION

PATENT NO. : 9,441,964 B2  
APPLICATION NO. : 14/379383  
DATED : September 13, 2016  
INVENTOR(S) : Jean Chery and Philippe Collard Page 1 of 1

It is certified that error appears in the above-identified patent and that said Letters Patent is hereby corrected as shown below:

In the Assignees item (73), please amend second assignee's name from "UNIVERSITE MONTPELLIER III SCIENCES ET TECHNIQUES" to "UNIVERSITE MONTPELLIER II SCIENCES ET TECHNIQUES".

Signed and Sealed this  
Seventh Day of March, 2017

Michelle K. Lee  
*Director of the United States Patent and Trademark Office*